UNITED STATES PATENT OFFICE 2,317,116

SYNTHETIC RESIN AND THE PREPARATION THEREOF

John L. Sheridan, Long Island City, N. Y., assignor to Custodis Construction Company, Inc., New York, N. Y., a corporation of Delaware No Drawing. Application July 24, 1940, Serial No. 347,143

11 Claims. (Cl. 260—46)

This invention relates to the production of synthetic resins and more particularly to the production of synthetic resins which are resistant to the action of acids and alkalis.

It has previously been known that cashew nut shell liquid may be reacted with aldehydes and polymerized to produce acid and alkali resistant resins. Such reactions have in most instances required high temperatures and/or extended periods to obtain the desired reaction and polymerization. Certain acid and alkaline catalysts have been suggested for use in these reactions, but in all cases it has been necessary to subject the raw cashew nut shell liquid to a temperature considerably in excess of ordinary room temperatures in order to start the polymerization, or the time required for polymerization at normal temperatures was too long, or the characteristics of the resin were undesirable or other objectionable features were present. A preliminary heat treatment of cashew nut shell liquid hastens the reaction but a cashew nut shell liquid which has been subjected to a preliminary heat treatment or accelerating action so that it reacts with an aldehyde at normal temperatures is very viscous. It is exceedingly hard to handle and mix at ordinary temperatures, thus making it difficult to mix with filler and to apply. If it is heated during the mixing to reduce its viscosity, the material hardens so quickly that there is insufficient time to thoroughly mix appreciable amounts of filler and to apply the mix.

It is an object of the present invention to provide an improved procedure for obtaining reaction and polymerization products of cashew nut shell liquid, and other similar substances, with aldehydes, and other similar substances. It is also an object to provide a procedure whereby the reaction and polymerization may be obtained at low temperatures and in short times, and with a greater degree of control. It is a further object to provide a coating or cementing composition that may be prepared readily and applied in the cold and that will solidify promptly to provide an acid and alkali resistant coating or cementing composition. Another object is to provide a procedure whereby the resin may be obtained in the form of a free flowing liquid to which large quantities of filler can be easily added and whereby the time of set and the working properties of the resin may be more readily controlled. Other objects will become apparent.

In describing the invention, particular reference will be made to cashew nut shell liquid, which is said to consist of about 90% anacardic acid, $C_{22}H_{32}O_3$, and about 10% cardol, $C_{32}H_{52}O_4$, with very small amounts of other materials. The invention may also be used in reactions involving these substances obtained from other sources or prepared by synthetic means. It may also be used with decomposition products of cashew nut shell liquid, such, for example, as cardanol, which may be obtained by vacuum or steam distillation of cashew nut shell liquid as described in Patent No. 2,098,824. It may also be used with cashew nut shell liquid that has been preheated, or treated with acids, etc., as described in Patent No. 2,128,247, to reduce the vesicatory action. These are merely examples of various substances with which the invention may be used. Obviously, it may also be used in the reaction of other similar substances and in using the term cashew nut shell liquid in the specification and claims, it is intended to include such other substances.

It has now been found that the reaction between cashew nut shell liquid and aldehydes, such, for example, as paraformaldehyde, may be expedited by the addition of sulfonic acid compounds, such, for example, as paratoluene sulfonic acid, a crystalline material. If, by adding such a sulfonic acid compound, the speed of the reaction at normal room temperatures is increased to such an extent that the handling and mixing period becomes too short, a substance, such as paratoluenesulfonylchloride, may be added to retard the speed of the reaction. For example, when the product is to be used as a cement, coating composition, molding material or other composition, the speed of the reaction may be so regulated that all the ingredients, including filler, if desired, may be added and thoroughly mixed and the material applied or used in the plastic state before it stiffens excessively.

In utilizing the invention in the preparation of a coating composition to coat and protect steel, concrete, wood, etc. from acid and alkali attack, cashew nut shell liquid may be reacted with paraformaldehyde in the presence of paratoluene sulfonic acid in the following proportions (by weight):

100 parts of cashew nut shell liquid
4 to 12 parts of paraformaldehyde
.004 to 25 parts of paratoluene sulfonic acid The paraformaldehyde and paratoluene sulfonic acid may be powdered and mixed and added as a mixture to the cashew nut shell liquid, or, if desired, the paraformaldehyde may be added to the cashew nut shell liquid first, and, upon addition of the paratoluene sulfonic acid, the thickening of the mixture will be hastened. Using a mixture containing about 12 parts of paraformaldehyde and 20 parts of paratoluene sulfonic acid per 100 parts of cashew nut shell liquid, after a few minutes the mass will have thickened sufficiently that when it is troweled on a vertical surface it will not flow. By using less of the sulfonic acid, or by adding a solvent, the material may be applied with a brush or spray gun. If desired, this composition may also be baked, after it is applied, to increase its ultimate hardness. Also, various modifying agents, such as natural or synthetic gums or resins (kauri, congo, manila, East Indies, ester gums, phenol-aldehyde resins, alkyd resins, etc.), plasticizers (tricresylphosphate, dibutyl phthalate, etc.), oils (linseed, China-wood, etc.), may be added to give desired characteristics for particular uses.

If desired, a retarder may be added to delay the initial setting time of the mixture. For example, 100 parts of cashew nut shell liquid may be reacted with about 4 to 14 parts of paraformaldehyde in the presence of about 1 to 20 parts of paratoluene sulfonic acid and about 6 to 24 parts of paratoluene sulfonyl chloride.

Fillers may also be added, for example, in the production of cements, coating compositions, etc. In this event, the initial setting time of the mixed materials should be sufficiently long to give adequate time for mixing the filler and other modifying ingredients into the resin and, as indicated above, the addition of a retarder may be desirable. The aldehyde, sulfonic acid, retarder and filler may be mixed together in powder form (preferably by grinding together in a pebble mill) and the mixture may be added to the cashew nut shell liquid.

For example, the following materials may be mixed together in dry powder form:

12 parts of paraformaldehyde
6 parts of paratoluenesulfonic acid
20 parts of paratoluenesulfonyl chloride
300 parts of 200 mesh silica sand Two to 4 parts by weight of the above powder may be added to 1 part by weight of cashew nut shell liquid just before it is desired to use the cement. When the solids are mixed with the cashew nut shell liquid, the mixture will remain sufficiently plastic to be worked easily with a trowel for from 5 minutes to an hour, or longer, depending upon the amount of the solid mixture which is added to the cashew nut shell liquid and the temperature. The mixture will harden to an acid and alkali resisting material at normal atmospheric temperatures (40° F. to 100° F.) in from 24 hours to a week, depending upon the proportion of liquid to powder and the temperature. If the paratoluene sulfonyl chloride is omitted and sufficient paratoluene sulfonic acid alone is added to the mixture to cause complete hardening within the desired time, the material may stiffen and become difficult to handle before it can be used. The addition of paratoluene sulfonyl chloride increases the length of time the material will remain in a plastic and workable state and at the same time does not unreasonably lengthen the time required for the mixture to completely harden. Other substances may be used in place of paratoluene sulfonyl chloride to retard the initial set, for example, ortho and meta toluene sulfonyl chloride or benzene sulfonyl chloride may be used, or a substance may be used which reacts with and thus reduces the effectiveness of the sulfonic acid, such as neutral metal peroxides, for instance, tin peroxide, or aromatic compounds with an amine group.

It is preferable where a non-porous substance is desired to not subject the mixture to high temperatures before it has reached an initial hardened state. For example, if it is exposed to a temperature in excess of about 120° F. while it is still in a semi-plastic state or while it is still tacky to the touch, the resin will develop a porous and sponge-like structure. Of course, if such a structure is desired, as for instance to provide good heat insulation properties, such higher temperatures may be applied before hardening.

The polymerization of the above described product will continue even after the material reaches an initially hardened stage at which it is acid and alkali resistant. It may take a month or longer for the material to develop its maximum hardness at ordinary room temperature. However, the maximum hardness can be developed in several hours by subjecting the material to a temperature of about 250° F. or in a longer time at a lower temperature.

Because the resin product described herein is resistant to action of acids and alkalis in general, it provides a relatively inexpensive material to use for the fabrication of vessels to resist chemicals; as an acid proof and alkali resisting cement for laying masonry, joining brick, tile, etc.; as a coating material to protect surfaces from corrosive attack, for example, as a lining for tanks, floors, etc.; as a material with which to make tile or brick or pipe; as a painting material; and, with rock and aggregate, as an acid proof "concrete" in general.

In addition to the uses indicated above, the resin may be used, with or without the addition of a filler and other modifying agents, as a bonding material in the manufacture of brake linings, as a material to impregnate and make impervious paper, cardboard, cloth, fabrics, etc., as a material from which can be fabricated chemically resistant piping, monolithic tanks and equipment, tile, etc. The product is fairly heat resistant and will resist temperatures of about 400° F., or higher. The product also has a high dielectric strength and may be used to advantage in electrical insulation and for the fabrication of switchboard panels, mountings for electrical instruments, switches, etc. These uses are but some of the possible uses to which this resin may be put and it is not intended that the usefulness of the invention be limited thereto.

The proportion of paratoluene sulfonic acid and of paratoluene sulfonyl chloride may be varied within wide limits, depending upon the rate of set or speed of reaction which is desired, and the temperature at which the reaction is to take place. About one part paratoluene sulfonic acid to 250 parts of cashew nut shell liquid will be sufficient to cause initial hardening in a period of 4 or 5 days at a temperature of 75° to 80° F. If the cashew nut shell liquid is preheated the time will be shorter. Larger quantities of the paratoluene sulfonic acid will increase the rate and 25 parts in 100 parts of cashew nut shell liquid will give an initial set in several minutes and complete hardening in about one-half hour in the absence of paratoluene sulfonyl chloride or other retarder.

It is preferred to use about 6 parts of paratoluene sulfonic acid and 20 to 24 parts of paratoluene sulfonyl chloride to 100 parts of cashew nut shell liquid. An increase in paratoluene sulfonyl chloride from about 15 to about 24% of the cashew nut shell liquid will about double the length of time the material will remain in a plastic and workable condition.

Also, the proportions of paraformaldehyde or other aldehydes may be varied within comparatively wide limits. It is preferred to use about 12 to 14 parts of paraformaldehyde to 100 parts of cashew nut shell liquid, although the reaction will take place in the presence of greater amounts of this substance and with much less, for example, 6% or even less. If the proportion of paraformaldehyde is reduced below 12 to 14 parts per hundred, the time required for polymerization is increased, providing the proportions of the other ingredients remain the same. This increased time for polymerization may be shortened by increasing the proportion of sulfonic acid. However, with resin compounded in this manner, the material will remain in a plastic and workable state for a shorter time. Also, it is desirable for most uses to keep the proportions of sulfonic acid low since readily available commercial grades of sulfonic acid are crystalline materials which are sticky and wet, due to mineral acid impurities and water of crystallization, and too large a proportion is difficult to incorporate into a mixture of filler and other ingredients in a pebble mill.

Cashew nut shell liquid, mixed with sufficient amounts of paraformaldehyde and paratoluene sulfonic acid to cause reaction at room temperature, is a liquid having the consistency of a light motor oil when the ingredients are first mixed. Therefore, as indicated above, for some purposes it is desirable to incorporate a filler into the mass. The choice of the filler and the amount depends upon how the resin will be used and the conditions to which it will be subjected and the proportion of filler to liquid can be varied within wide limits. Among the fillers suitable for use, although it is not intended to limit the scope of the invention to these particular materials, are silica, asbestos fibre, saw dust, wood flour, slate dust, clay, shale, barytes (BaSO₄), carbon or graphite, etc. If coke flour or other carbon substance is used as the filler in place of the silica or other filler, the cement, etc. will be resistant to hydrofluoric acid as well as other acids and alkalis. When small amounts of filler are used, the material may be applied by means of a brush or spray. When larger amounts are used, it may be extruded by means of an ordinary brick extruding machine to produce a brick or tile. The finer the filler the greater is the quantity of liquid required to wet it. For instance, 4 parts of a mixed powder, as described above, may be worked into 1 part of liquid when 200 mesh sand is used, the mixture being workable with a trowel. If 100 mesh sand is used 5 parts of the powder can be worked into the same amount of liquid. When the mixture is to be extruded, probably 25% more filler may be added, although this is not necessary. If the resin is to be used as a coating material in lieu of a paint, etc., no filler need be added or up to about 2 parts filler to one of liquid may be used. Instead of adding filler the desired increased thickness may be obtained by allowing the mixture to stand for a few minutes to thicken by itself. This procedure might be used to advantage where the use of a filler might be objectionable.

In the preparation of a cement it is preferred to use silica sand in the proportions of about 250 to 400 parts of silica sand, about 60% of which will pass a 200 mesh sieve and all of which will pass a 75 mesh sieve, to 100 parts of cashew nut shell liquid.

In view of the fact that raw cashew nut shell liquid has a vesicant action on the human skin, it is preferred to use a cashew nut shell liquid which has been treated, for example, by heating the substance with acid, etc., to react with the sulfide sulfur as described in Patent No. 2,128,247. As indicated above, however, it may also be used with raw cashew nut shell liquid or with products resulting from heat or other treatment thereof.

Other aldehydes may be used in place of the paraformaldehyde; for example, paraldehyde, benzaldehyde and furfuraldehyde may be used, although these are liquids and so are less convenient to handle, since they cannot be added to the other solids in the form of a powder. Hexamethylenetetramine may also be used, in which event it is preferred to bake the product to obtain complete hardness.

Other sulfonic acids may be used in place of paratoluene sulfonic acid. For example, benzene sulfonic acid is just as satisfactory and is cheaper and can be used in somewhat smaller quantities than the paratoluene sulfonic acid to obtain the same results. For example, 1 part of commercial benzene sulfonic acid may take the place of about 2 to 2½ parts of paratoluene sulfonic acid. Ortho and meta toluene sulfonic acids and similar sulfonic acids with other alkyl groups in place of the methyl group may be used. The ortho and para phenol sulfonic acids also may be used, as well as phenol disulfonic acid, which is a liquid. Naphthalene and naphtol sulfonic acids or aliphatic sulfonic acids, such as ethyl sulfonic acid, sulfo acetic acid, sulfo propionic acid and acids obtained from sulfonating petroleum distillates, etc., may be used.

Other sulfonic acids, such as chlorosulfonic acid, may also be used. When the latter is added, the reaction proceeds very rapidly and is difficult to control. In order to obtain better control of the reaction, the chlorosulfonic acid may be added to bentonite (for example, 3 parts of 200 mesh bentonite to 1 part of chlorosulfonic acid) or other carrier or filler to produce a powder which may be conveniently added to the cashew nut shell liquid. Various examples of suitable sulfonic acids have been given, although it is not intended to limit the invention to the particular ones named.

It is obvious that many other modifications of the inveniton than those described may be used and it is not intended to limit the invention to the particular examples given as illustrative. For example, other proportions and other temperatures may be used to meet particular requirements. Also, if the product is to be used where its acid and alkali resistance are not important, fillers and other modifying agents which are not resistant to acids and alkalis may be added as modifying agents.

The terms used in describing and claiming the invention have been used as terms of illustration and not as terms of limitation and all equivalents of the terms used are intended to be included within the scope of the appended claims. In referring to a benzene sulfonic acid or a benzene sulfonyl chloride in the appended claims, it is intended to include alkyl or hydroxyl substituted benzene sulfonic acids or sulfonyl chlorides, such as toluene sulfonic acid or sulfonyl chloride or phenol sulfonic acid or sulfonyl chloride.

I claim:

1. A method for preparing resins comprising reacting cashew nut shell liquid with an aldehyde in the presence of a benzene sulfonic acid and a benzene sulfonyl chloride.

2. A method of preparing resins comprising reacting cashew nut shell liquid with paraformaldehyde in the presence of a benzene sulfonic acid and a benzene sulfonyl chloride.

3. A method of preparing resins comprising reacting cashew nut shell liquid with paraformaldehyde in the presence of paratoluene sulfonic acid and paratoluene sulfonyl chloride.

4. A method of preparing resins comprising mixing an aldehyde, a benzene sulfonic acid and a benzene sulfonyl chloride in finely divided form, adding the mixture to cashew nut shell liquid and maintaining the mixture at temperatures of 40 to 110° F.

5. A method of preparing an acid and alkali resistant resinous composition comprising mixing paraformaldehyde and paratoluene sulfonic acid, with paratoluene sulfonyl chloride and a filler, and adding the mixture to cashew nut shell liquid.

6. A new composition of matter resulting from reacting cashew nut shell liquid with an aldehyde in the presence of a benzene sulfonic acid and a benzene sulfonyl chloride.

7. A new composition of matter resulting from reacting cashew nut shell liquid with paraformaldehyde in the presence of paratoluene sulfonic acid and paratoluene sulfonyl chloride.

8. An acid and alkali resistant composition, comprising the reaction product of cashew nut shell liquid with paraformaldehyde in the presence of paratoluene sulfonyl chloride, paratoluene sulfonic acid and silica sand.

9. An acid and alkali resistant composition, comprising the reaction product of about 100 parts of cashew nut shell liquid, about 4 to 14 parts paraformaldehyde, about 1 to 20 parts of paratoluene sulfonic acid, about 6 to 24 parts of paratoluene sulfonyl chloride and about 250 to 400 parts of silica sand 60 percent of which will pass a 200 mesh sieve and all of which will pass a 75 mesh sieve.

10. A method of preparing a resin which comprises reacting cashew nut shell liquid with an aldehyde in the present of an alkyl substituted benzene sulfonic acid and a benzene sulfonyl chloride.

11. A method of preparing a resin which comprises reacting cashew nut shell liquid with an aldehyde in the presence of an hydroxyl substituted benzene sulfonic acid and a benzene sulfonyl chloride.

JOHN L. SHERIDAN.